United States Patent
Anderson et al.

(10) Patent No.: US 6,785,019 B2
(45) Date of Patent: Aug. 31, 2004

(54) METHOD AND SYSTEM FOR A MULTI-TASKING PRINTER CAPABLE OF PRINTING AND PROCESSING IMAGE DATA

(75) Inventors: Eric C. Anderson, San Jose, CA (US); Stephen D. Saylor, Morgan Hill, CA (US)

(73) Assignee: FlashPoint Technology, Inc., Peterborough, NH (US)

(*) Notice: Subject to any disclaimer, the term of this patent is extended or adjusted under 35 U.S.C. 154(b) by 0 days.

(21) Appl. No.: 09/942,455

(22) Filed: Aug. 29, 2001

(65) Prior Publication Data

US 2002/0031147 A1 Mar. 14, 2002

Related U.S. Application Data

(63) Continuation of application No. 09/107,809, filed on Jun. 30, 1998.

(51) Int. Cl.[7] ............................................. G06F 15/00
(52) U.S. Cl. ..................... 358/1.9; 358/1.18; 358/296
(58) Field of Search ............................... 358/1.9, 1.18, 358/296, 1.1, 1.6, 402, 44 D, 453, 468, 442, 403; 346/76, 107 R; 400/120; 707/104; 382/181, 203; 348/207.2, 375, 376, 333.01

(56) References Cited

U.S. PATENT DOCUMENTS

| | | | |
|---|---|---|---|
| 5,402,170 A | 3/1995 | Parulski et al. | ............ 348/211 |
| 5,825,988 A | 10/1998 | Collard et al. | ............ 358/1.13 |
| 5,838,458 A | * 11/1998 | Tsai | ............ 358/402 |
| 5,864,870 A | * 1/1999 | Guck | ............ 707/104 |
| 6,052,692 A | 4/2000 | Anderson et al. | ............ 707/102 |
| 6,094,282 A | * 7/2000 | Hoda et al. | ............ 358/296 |
| 6,115,024 A | 9/2000 | Hayama | ............ 345/116 |
| 6,552,743 B1 | * 4/2003 | Rissman | ............ 348/207.2 |

* cited by examiner

*Primary Examiner*—Twyler Marie Lamb
(74) *Attorney, Agent, or Firm*—Sawyer Law Group LLP

(57) ABSTRACT

A system and method for providing a printer capable of generating a hard copy of at least one image is disclosed. The at least one image is stored in an image file on a removable memory. In one aspect, the method and system include a graphical user interface for allowing a user to view at least a portion of the image and a printing device coupled with the graphical user interface for printing the hard copy of the at least one image. In a second aspect, the method and system include means for storing the at least one image in a second format and a printing device coupled with the storing means for printing the hard copy of the at least one image. In a third aspect, the method and system include means for modifying the at least one image, means coupled with the modifying means for storing the at modified at least one image in the first format, and a printing device coupled with the storing means for printing the hard copy of the at least one image.

11 Claims, 6 Drawing Sheets

METHOD AND SYSTEM FOR A MULTI-TASKING PRINTER CAPABLE OF PRINTING AND PROCESSING IMAGE DATA

This application is a continuation of Ser. No. 09/107,809 filed Jun. 30, 1998.

FIELD OF THE INVENTION

The present invention relates to printers and more particularly to a method and system for providing a printer which is capable of performing a variety of functions in addition to printing images from a particular format.

BACKGROUND OF THE INVENTION

Conventional printers are used to print images which may have been captured from a variety of devices, including an image capture device such as a digital camera. When generating a hard copy of the image, the conventional printer is typically coupled to a computer or other microprocessor based system. For example, data for images captured by a digital camera may be processed and stored in a particular format such as JPEG (Joint Photographic Experts Group). The digital camera may process the raw image data, such as color filter array ("CFA") data, and save the processed image files on a removable memory, such as a flash card. Images on the removable memory are then typically archived on a hard drive of a computer or another memory compatible with the computer. Alternatively, the digital camera may provide little or no data processing functions. In this case, raw image data is provided to the computer, which processes the image data and stores the processed data in an image file.

In either case, a user typically employs the computer in conjunction with a printer to generate a hard copy of the image stored in an image file containing processed image data. When a user desires a hard copy of such an image, the user selects the appropriate image file from those accessible to the computer and directs the computer to print the image. Typically, the computer then instructs the conventional printer to print the image.

The conventional printer typically includes a communication port for transferring information to and receiving information from the computer, a buffer for storing data of an image to be printed, and a printing device such as an inkjet. Some printers also include a status liquid crystal display ("LCD") for providing limited user interaction. Using the status LCD, a user can provide some instructions to the conventional printer without using the computer. However, the conventional printer typically receives signals and data in a particular format from the computer via the communication port. The format of the data is one which the conventional printer can use for printing an image. The conventional printer typically saves the image data in the buffer. The image data is then converted to the appropriate format for controlling the printing devices and provided to the printing devices. Thus, the hard copy of the image is printed.

Consequently, most conventional printers require some interaction with the computer in order to print images stored in an image file. Conventional printers also require either the computer or the digital camera to process raw image data into a format recognized by the conventional printer. A few conventional printers are capable of printing an image stored on another memory, such as a PCMCIA (Personal Computer Memory Card International Association) card. However, such a printer is limited to printing images from processed image data stored in a particular format. The user interaction allowed between such a conventional printer and the user is also limited. Typically, the conventional printer merely prints all image files on the PCMCIA card or allows a user to select which images are to be printed from the image files stored on the PCMCIA card.

Accordingly, what is needed is a system and method for providing additional functionality via a printer. The present invention addresses such a need.

SUMMARY OF THE INVENTION

The present invention provides a method and system for providing a printer capable of generating a hard copy of at least one image. The at least one image is stored in an image file on a removable memory. In one aspect, the method and system comprise providing a graphical user interface for allowing a user to view at least a portion of the image and a printing device coupled with the graphical user interface for printing the hard copy of the at least one image. In a second aspect, the method and system comprise providing means for storing the at least one image in a second format and a printing device coupled with the storing means for printing the hard copy of the at least one image. In a third aspect, the method and system comprise providing means for modifying the at least one image, means coupled with the modifying means for storing the at modified at least one image in the first format, and a printing device coupled with the storing means for printing the hard copy of the at least one image.

According to the system and method disclosed herein, the present invention allows a printer to provide increased functionality, thereby increasing overall system performance and simplifying user interactions.

DETAILED DESCRIPTION OF THE INVENTION

The present invention relates to an improvement in printers. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
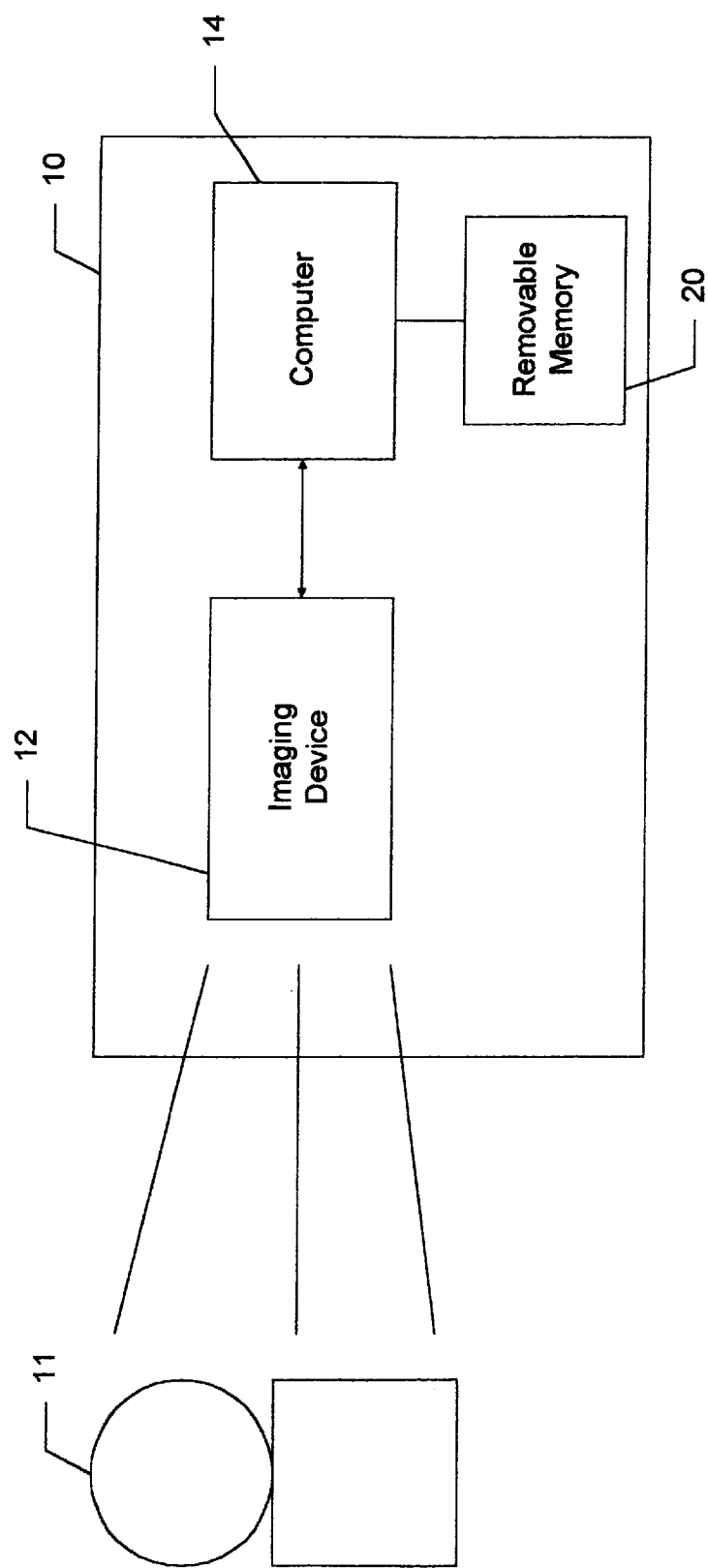
FIG. 1 is a block diagram of a digital camera.

FIG. 1 is a block diagram of a digital camera 10 which may be used to capture images. The digital camera 10 includes an imaging device 12, a processing system 14, and a removable memory 20, such as a flash card. The imaging device 12 is optically coupled to an object 12 and electrically coupled to the processing system 14. Once a photographer has focused the imaging device 12 on the object 11 and, using a capture button or some other means, instructed the digital camera 10 to capture an image of the object 11, the processing system 13 commands the imaging device 12 to capture raw image data representing the object 11. Typically, the raw image data is color filter array ("CFA") data. The captured raw image data is transferred to the processing system 14 which may store the image on the removable memory 20.

In a first paradigm, the processing system 14 performs various processing functions on the image data before storing the image data on the removable memory 20. The removable memory 20 may be a flash disk. However, another type of removable memory 20 may be used. In the first paradigm, the image stored in the removable memory 20 may include JPEG (Joint Photographic Experts Group) data. However, in a second paradigm, the processing system 14 stores the raw image data on the removable memory 20. Note that the removable memory 20 may be in addition to or in lieu of an internal memory (not shown) for the digital camera 10.

Figure 2:
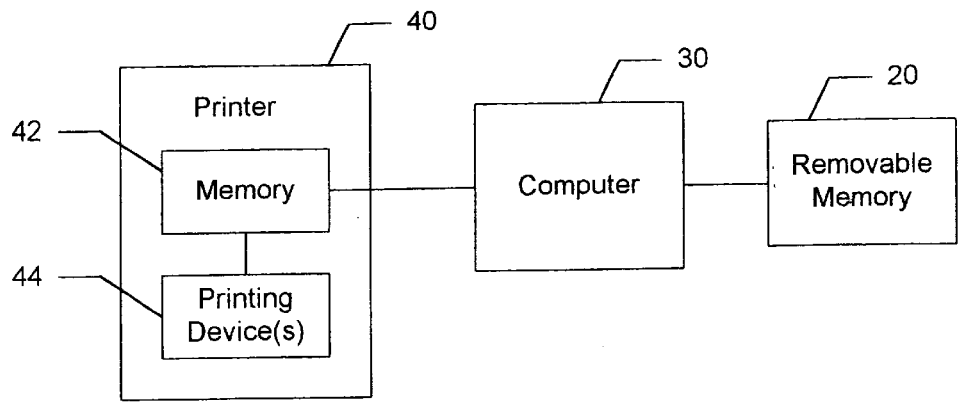
FIG. 2 is a block diagram of a conventional system for printing images captured by a digital camera.

FIG. 2 depicts a conventional system for generating hard copy of images stored on the removable memory 20. The conventional system includes a computer 30 and a conventional printer 40. The conventional printer 40 includes a memory 42 and a printing device 44. The memory 42 may include a page buffer. The printing device 44 may include print heads. The images may be copied or transferred from the removable memory 20 to an internal drive (not shown) of the computer or another storage medium (not shown). In addition, if the image is stored in the internal memory of the digital camera 10, then the internal memory of the digital camera 10 may be coupled to the computer 30 instead of using the removable memory 20. If the image stored on the removable memory 20 is stored as unprocessed data, then the computer 30 also processes the image data and stores the processed data, for example as a JPEG image.

Figure 3:
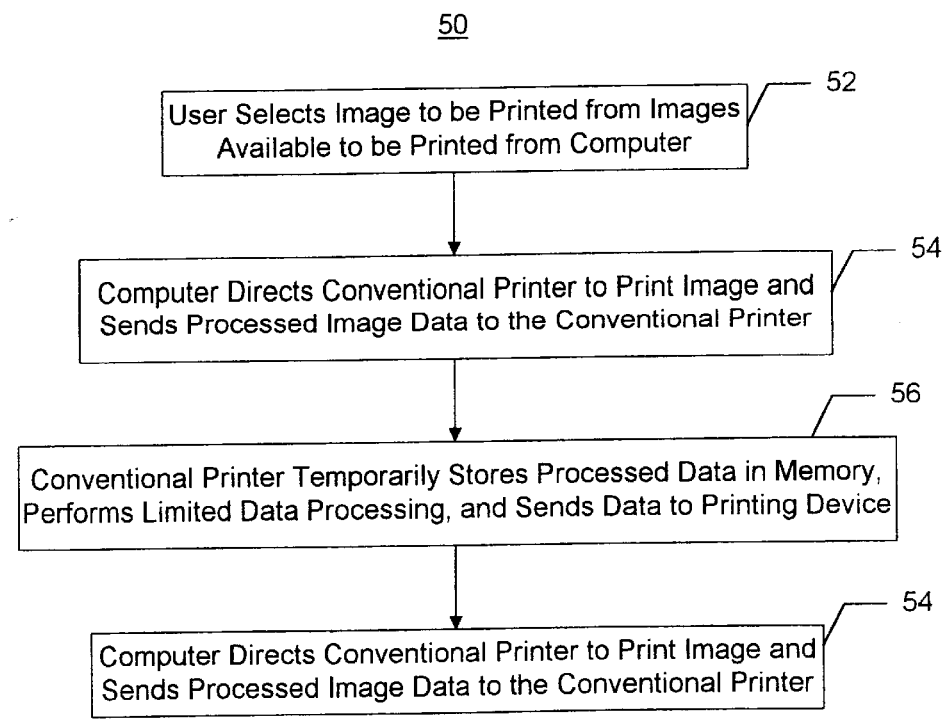
FIG. 3 is a flow chart depicting a conventional method for obtaining a hard copy of an image captured by a digital camera.

FIG. 3 depicts a conventional method 50 for generating hard copy of an image. In the first paradigm, where the digital camera 10 provides image processing functions, the method 50 may commence after the computer 20 accesses the removable memory 20. However, in the second paradigm, where the digital camera 10 stores raw image data, the method 50 commences after the computer 20 processes the raw image data.

The user selects the image to be printed from the images available for printing using the computer 30, via step 52. The computer then directs the printer to print the image and sends the processed image data to the conventional printer, via step 54. The conventional printer then stores the processed image data in the memory 42, performs some limited image processing and sends the data to the printing device 44 via step 56. The limited image processing performed in step 56 converts the processed image data to the appropriate format for controlling the printing device 44. The printing device 44 then prints the hard copy via step 58.

The conventional printer 40 may also include a status liquid crystal display ("LCD") (not shown) for providing limited user interaction without requiring the user to provide and receive instructions through the computer 30. The conventional printer 40 may also be capable of printing an image stored on another memory, such as a PCMCIA (Personal Computer Memory Card International Association) card that is connected directly to the conventional printer 40. However, one of ordinary skill in the art will realize that only very limited data processing and user interaction are performed by the conventional printer 40. Typically, the conventional printer merely prints all image files on the PCMCIA card or allows a user to select which images are to be printed from the image files stored on the PCMCIA card. Thus, the images stored on the PCMCIA card typically include processed image data.

One of ordinary skill in the art will realize that most conventional printers 40 require some interaction with the computer 30 in order to print images stored in an image file. One of ordinary skill in the art will also recognize that the conventional printer 40 also uses either the computer 30 or the digital camera 10 to process raw image data into a format recognized by the conventional printer 30. Even where the conventional printer 30 is capable of printing images stored on a removable memory directly connected to the conventional printer 40, the images include processed image data. In addition, one of ordinary skill in the art will also readily realize that the conventional printer 40 performs few operations other than printing. For example, the conventional printer 40 does not display images and, other than temporarily saving image data for printing, does not save image data. Moreover, the conventional printer 40 is typically capable of working with a very limited number of file formats for image data provided to the printer 40. Typically, the computer 30 is responsible for arranging data in a format which the printer 40 can use.

The present invention provides a method and system for providing a printer capable of generating a hard copy of at least one image. The at least one image is stored in an image file on a removable memory. In one aspect, the method and system comprise providing a graphical user interface for allowing a user to view at least a portion of the image and a printing device coupled with the graphical user interface for printing the hard copy of the at least one image. In a second aspect, the method and system comprise providing means for storing the at least one image in a second format and a printing device coupled with the storing means for printing the hard copy of the at least one image. In a third aspect, the method and system comprise providing means for modifying the at least one image, means coupled with the modifying means for storing the modified at least one image in the first format, and a printing device coupled with the storing means for printing the hard copy of the at least one image. Thus, a printer provided in accordance with the present invention provides has increased functionality. The present invention will be described in terms of a printer having particular functions and a particular architecture. However, one of ordinary skill in the art will readily recognize that this method and system will operate effectively for other functions provided by the printer and other architectures.

Utilizing a printer in accordance in with the present invention provides significant added functionality without requiring the use of a computer. A user can view images on the printer built in accordance with the present invention. Using such a printer, a user can also modify images. Moreover, a user is allowed save the image in a new file format and process raw image data using the printer in accordance with the present. All of these functions are provided by the printer without requiring the use of a computer.

Figure 4:
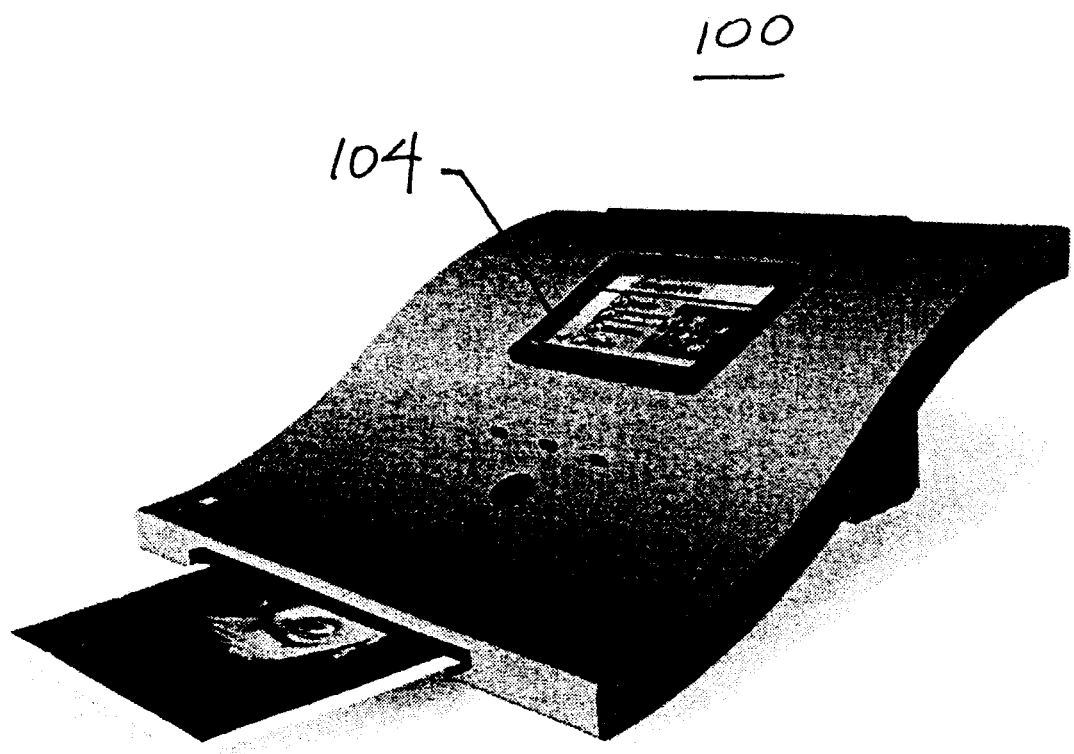
FIG. 4 is a perspective view of a printer in accordance with the present invention.

To more particularly illustrate the method and system in accordance with the present invention, refer now to FIG. 4 depicting a perspective view of one embodiment of a printer 100 in accordance with the present invention. The printer 100 includes an LCD 104. The LCD 104 is capable of providing a graphical user interface, discussed more fully below.

Figure 5:
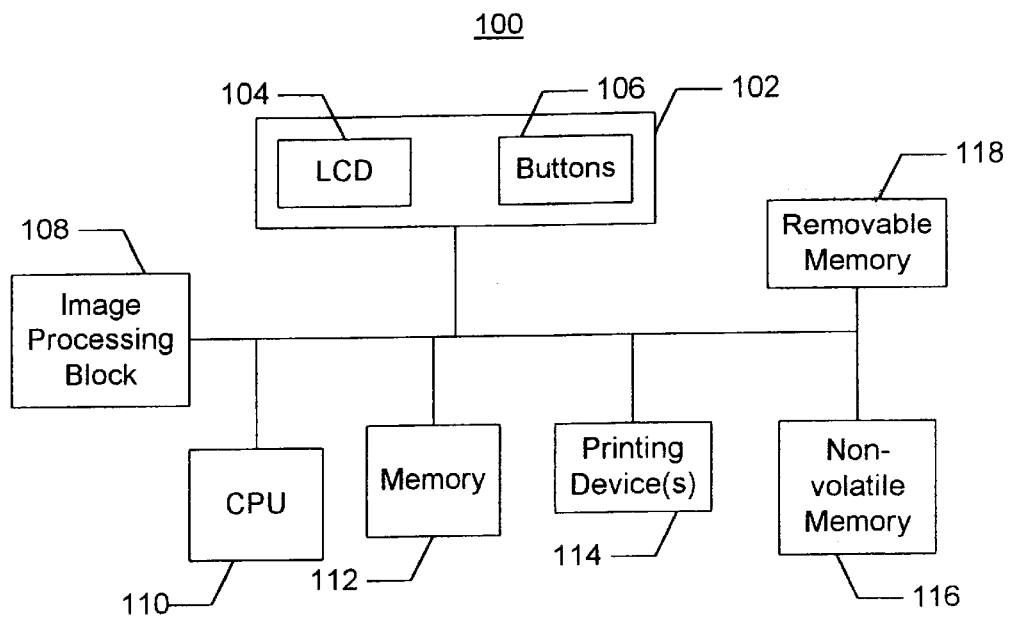
FIG. 5 is a block diagram of one embodiment of a printer in accordance with the present invention.

FIG. 5 depicts a block diagram of one embodiment of the printer 100 in accordance with the present invention. The printer 100 in accordance with the present invention includes a graphical user interface ("GUI") 102. The GUI 102 preferably includes an LCD display 104 and buttons 106 for allowing user interaction. In addition, the GUI 102 could include a touch screen (not shown) in lieu of buttons 106. The printer 100 includes a central processing unit ("CPU") 110, a memory 112, a printing device 114, a non-volatile memory 116, and a removable memory receptacle 118. The non-volatile memory 114, which may typically comprise a conventional read-only memory or flash memory, stores a set of computer-readable program instructions to control the operation of printer 100. The CPU 110 incapable of executing the program instructions stored in the non-volatile memory 116. The printer 100 depicted in FIG. 4 provides at least a portion of image processing in hardware using image processing block 108. However, nothing prevents the method and system from being used in a printer 100 which processes image data in software. In such a system, the image processing block 108 would be omitted. The removable memory receptacle 118 holds the removable memory 20 on which images are stored. The printer 100 can print images directly from the removable memory 20. Although the printer 100 is shown as communicating to the removable memory 20 through the receptacle 118, the printer 100 may communicate using another mechanism (not shown). For example, the printer 100 could send and receive data through an Infrared Data Association (IrDA) serial port or other communication device. In addition, the printer 100 can provide a video output (not shown). Although not depicted, in one embodiment, the printer 100 can also be coupled to a computer (not shown) for printing images in a conventional fashion.

Because the printer 100 includes the LCD 104 and corresponding computer readable program instructions, the printer 100 is capable of displaying images on the LCD 104. The images displayed may also be rotated by the printer 100 so that a user can view portrait or landscape images in the proper orientation from the same point of view. Moreover, the printer 100 is capable of processing raw image data, such as CFA data. In the embodiment shown, the image processing block 108 processes raw image data. However, in another embodiment, processing of raw image data is performed using software which is preferably stored in the non-volatile memory 116. In a preferred embodiment, the printer 100 also allows a user to modify images, including adding sound, and is capable of reading and writing images in a number of different file formats. For example, a user could modify an image by adjusting the contrast, the brightness, or the hue. The user could also crop the image, rotate the image, compensate for distortion, perform perspective compensation, or other operations. The printer 100 can also be used to archive images captured, for example by storing processed image data or image data saved in a different file format on the removable memory 20 inserted in the removable memory receptacle 118.

Figure 6:
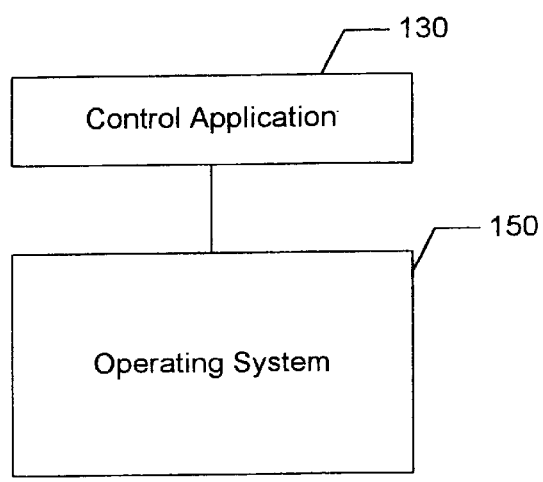
FIG. 6 is a high level block diagram of a portion of the architecture of a printer in accordance with the present invention.

In order to provide the functions discussed above, the printer 100 includes and operating system stored in the non-volatile memory 116. FIG. 6 depicts a high level diagram of one embodiment of a portion of the architecture of the printer 100 in accordance with the present invention. The architecture includes a control application 130 and an operating system 150. The control application 130 communicates with various portions of the operating system 150. The control application 130 receives notification of events and takes appropriate action, including communicating with some of the subsystems of the printer 100.

Figure 7:
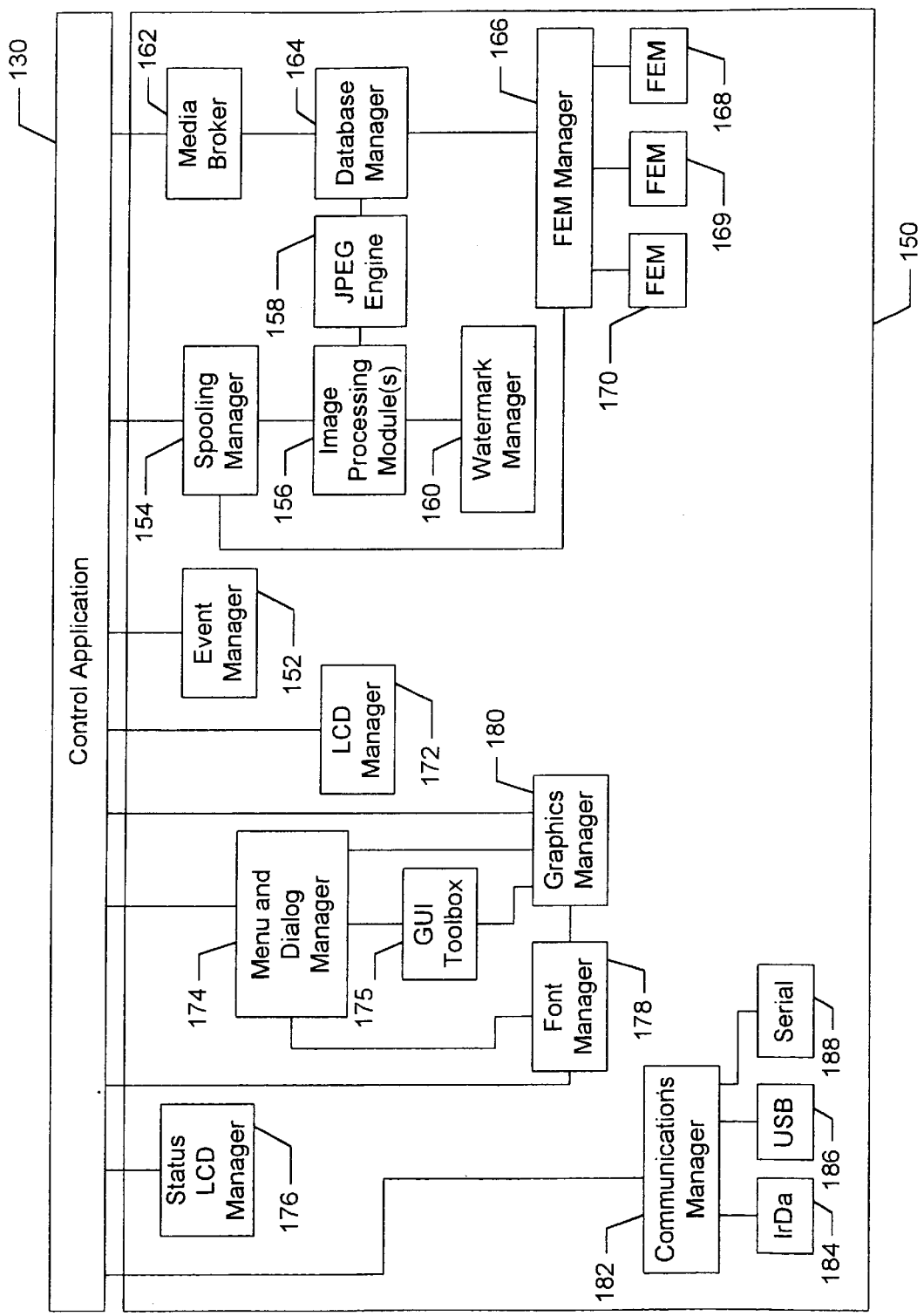
FIG. 7 is a more detailed block diagram of the architecture of a printer in accordance with the present invention.

FIG. 7 depicts a more detailed embodiment of the architecture of the printer in accordance with the present invention. Preferably, the operating system 150 is provided using C or C++ code. However, nothing prevents the use of an operating system written in another language. Also in a preferred embodiment, the operating system 150 is similar to and compatible with an operating system provided in the digital camera 10. However, nothing prevents the use of another operating system in the digital camera 10.

As discussed above, the operating system 150 communicates with the control application 120. Coupled with the control application 120 are an event manager 152, a spooling manager 154, and a media broker 162. The operating system 150 further includes an image processing module(s) 156 coupled to the spooling manager 154 and a watermark manager 160 coupled to the image processing module(s) 156. A JPEG engine 158 is preferably coupled to the image processing module(s) 156. If image data is compressed into another format, the engine 158 may use a format other than JPEG. A database manager 164 if coupled to the media broker 164 and the JPEG engine 158. A file extension module ("FEM") manager 166 is coupled to the database manager 164 and the spooling manager 154. Three file FEMs 168, 169, and 170 are depicted as coupled with the FEM manager 166.

The event manager 152 receives notification of interrupt events from various portions of the printer 100. For example, the event manager 152 may be notified when the removable memory 20 is inserted into or removed from the removable memory receptacle 118. Similarly, the event manager 152 may be notified when the user pushes one of the buttons 106 in the graphical user interface 102. In turn, the event manager 152 notifies the control application 130 of the events.

The spooling manager 154 oversees a background spooling process (not shown) used for processing raw image data in the background. Note that if processing is not desired to take place in the background, the spooling manager 154 may be omitted. Because the printer 100 can process image data in the background, the printer 100 can multitask and perform other functions, such as printing an image, while data for another image is being processed. In order to process raw image data, the spooling manager 154 uses the image processing module(s) 156 and the JPEG engine 158. Preferably, the JPEG engine handles compression and decompression of images. Preferably, the image processing module(s) 156 use the compression provided by the JPEG engine to store processed image data in JPEG format. During processing, the spooling manager 154 also communicates with FEM manager 166 and utilizes FEMs 168, 169, or 170 to be able to provide the processed image data in the appropriate format. When image processing is completed, the spooling manager 154 may also transfer image data to another memory, such as the removable memory 20 for storage. The spooling manager 154 also notifies the control application 130 that processing for that image has completed.

The media broker 162 provides an intermediary between the database of images and sounds and the graphical user interface 102. The media broker aids in retrieving images from a database for display on the LCD 104. The media broker 162 also sorts images in the database and is capable of attaching sound to an image file. Furthermore, the media broker 162 allows a user to group images for placement in a folder. The media broker 162 also allows a user to mark an image. In addition, the media broker 162 may also allow a user to find desired images using a search function.

The database manager 164 aids in building and maintaining a database of images (not shown) accessible to the printer 100. The database manager 164 also uses the decompression provided by the JPEG engine 158 to aid in displaying images in the database. While building the database of images, the database manager 164 preferably communicates with the FEM manager 166 to ensure that the appropriate FEM 168, 169, or 170 exists for displaying images having a particular file format. Preferably, if the appropriate FEM 168, 169, or 170 does not exist, then the image is not included in the database. In a preferred embodiment, the database manager 164 is capable of handling "hot" mounting and unmounting of the removable memory 20. Thus, in a preferred embodiment, the removable memory 20 can be inserted into or removed from printer 100 during image processing. For a more detailed description of hot mounting and unmounting of volumes in accordance with the present inventions, please refer to U.S. patent application Ser. No. 09/016,153 filed on Jan. 30, 1998 entitled "Method and System for Managing Image Related Events Without Compromising Image Processing" and assigned to the assignee of the present invention. Applicant hereby incorporated by reference the above-mentioned U.S. patent application.

The FEMs 168, 169, and 170 are plug-in modules that provide support for file formats. In a preferred embodiment, one of the FEMs 168, 169, or 170 includes a "built-in" or default file format in which image files are stored if another file format is not chosen. In the preferred embodiment of the operating system 150, the FEM 168 includes the built-in file format. Thus, the printer 100 as shown supports two additional file formats, one for each additional FEM 169 and 170. However, nothing prevents the printer 100 from supporting a different number of additional file formats.

Each FEM 168, 169, and 170 includes a file format and APIs. Each file format determines how an image file consistent with the file format is stored. For example, the formats for image data include TIFF, JPEG, and EXIF. Moreover, each file format may pack image data and other information stored in a file in different ways. Each FEM 168, 169, and 170 contains information regarding both the type of data stored in a file using the file format and how the data are packed in the file. The APIs allow the FEMs 168, 169, and 170 to communicate with the FEM manager 166. Consequently, the APIs are consistent with those developed for communication with the FEM manager 166.

The FEM manager 166 is capable of communicating with the individual FEMs 168, 169, and 170 even though each FEM 168, 169, and 170 supports a different file format. Transfer of information between the FEM manager 166 and each of the FEMs 168, 169, and 170 are specific to the file formats supported by each FEM 168, 169, and 170. The FEM manager 166 also communicates with the media broker 162 through the database manager 164 and with the spooling manager 154. Communication between the FEM manager 166 and another portion of the operating system 150, is standardized and independent of the file formats of individual image files, not shown. However, nothing prevents the built-in file format from being provided through a mechanism other than the FEM 168, 169, or 170. For a more detailed description of making additional file formats available to the printer in accordance with the present inventions, please refer to U.S. patent application Ser. No. 08/978,794 filed on Nov. 26, 1997 and entitled "Method and System for Extending the Available Image File Formats in an Image Capture Device" and assigned to the assignee of the present invention. Applicant hereby incorporated by reference the above-mentioned U.S. patent application.

FIG. 7 also depicts a portion of the architecture used in presenting images to the user and controlling the GUI 102. The portion of the operating system 150 used in presenting images to the user and controlling the GUI 102 includes a LCD manager 172, a menu and dialog manager 174, and an optional status LCD manager 176, all of which are coupled to the control application 130. The GUI toolbox 175 is coupled to the menu and dialog manager 174. A font manager 178 is coupled to the control application 130 and the menu and dialog manager 174. A graphics manager 180 is coupled to the menu and dialog manager 174, the control application 130, the GUI toolbox 175, and the font manager 178.

The GUI toolbox 175 handles various tasks used in providing a graphical user interface, such as drawing icons and providing menus. Preferably, the GUI toolbox 175 includes a plurality of Application Program Interfaces ("APIs") used in conjunction with the graphics manager 180. The LCD manager 172 provides routines used to control the LCD 102. Similarly, the optional status LCD manager 176 controls an optional status LCD (not shown). The graphics manager 180 is used to create the display shown on the LCD 102. Thus, images, menus, or other items to be displayed on the LCD 102 are controlled by the graphics manager 180. The graphics manager 180 provides functions used to render these items on the LCD 102. Preferably, the graphics manager 180 is a toolbox called by various portions of the operating system 150.

The menu and dialog manager 174 allows menus to be provided to the user via the LCD 102. Preferably, the menus can be customizable. The menu and dialog manager 174 utilizes fonts provided by the font manager 178 to define the fonts to be used in the menu. The menu and dialog manager 174 communicates with the graphics manager 180 to provide the menu to the LCD 102. The user utilizes the menus to interact with the printer 100.

FIG. 7 also depicts a communications manager 182 coupled to the control application 130. Coupled to the communications manager 182 are IrDA port 184, Universal Serial Bus ("USB") port 186, and serial port 188. The ports 184, 186, and 188 provide interfaces to other systems, such as the digital camera 10 or a host (not shown). Note that other types of ports (not shown) could be used. The communications manager 182 enables and disables communications and controls the ports 184, 186, and 188. Consequently, the printer 100 can communicate with other devices, such as the printing device 114 through a variety of mechanisms.

Figure 8:
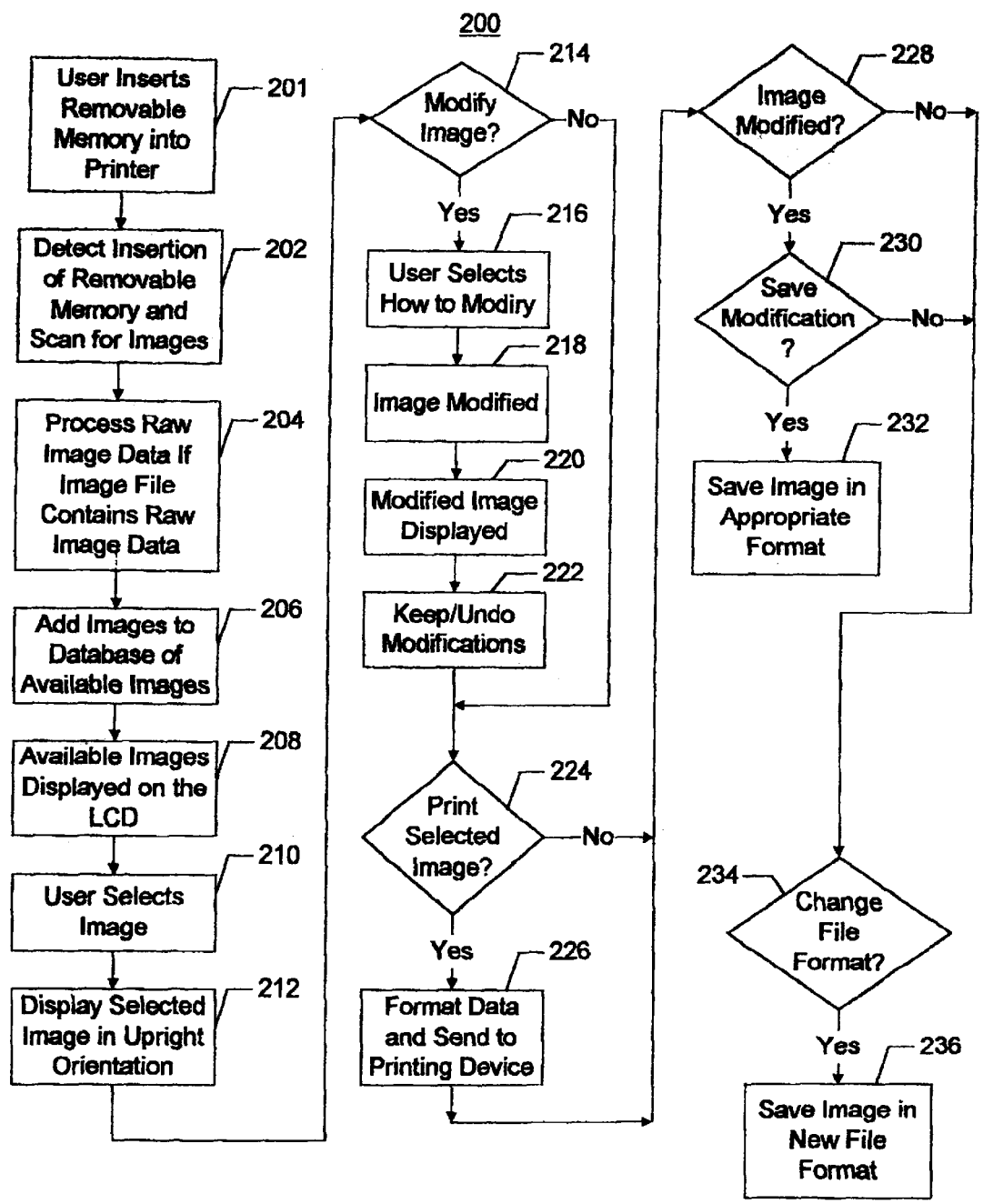
FIG. 8 is a flow chart depicting one embodiment of a method for utilizing a printer in accordance with the present invention.

FIG. 8 depicts one embodiment of a method 200 for utilizing the printer 100. Although FIG. 8 depicts the method 200 as performing certain steps in a particular order, the method 200 could perform these steps in another order or could perform other steps. A user inserts the removable memory 20 into the removable memory receptacle 118, via step 201. Thus, the user provides the images files that are of interest to the printer 100 in the step 201. In an alternate embodiment, the user might provide these image files over the IrDA port or other communication device. The printer 100 detects the insertion of the removable memory 20 and scans the removable memory for image files, via step 202. If the removable memory 20 includes image files having raw image data, then via step 204, the raw image data is processed. The images on the removable memory, including the images having raw image data being processed, are added to the database of available image files via step 206. In a preferred embodiment, only image files having file formats which are supported by the FEMs 168, 169, or 170 are added to the database in step 206. The available images in the database are then displayed on the LCD 102, via step 208. In one embodiment, the images are displayed by displaying small, low resolution version of the images, known as thumbnails. In an alternate embodiment, the available images may be displayed as a list.

A user may then select an image via step 210. The user can perform a variety of operations on the image selected, such as modifying the image by adding sound or text, or printing the image. The image is then displayed via step 212. Preferably, a larger, low resolution version of the image is displayed in step 212.

It is then determined if the user desires to modify the image, via step 214. If the user wishes to modify the image, then via step 216 the user selects how the image is to be modified. For example, the user may rotate or crop the image, add sound, or adjust the hue or brightness. The modified image is then displayed on the LCD 104, via step 220. The modifications are then kept or undone via step 222, depending on whether the user desires to keep the modifications.

If it is determined in step 214 that the user does not wish to modify the image, or if step 222 is completed, then it is determined whether the user has directed the printer 100 to print the image, via step 224. If the user has directed the printer 100 to print the image; then via step 226 the image data is formatted and provided to the printing device 114 which generates a hard copy of the image.

If the user has not directed the printer 100 to print the image or the printer 100 has formatted and provided the data to the printing device 114 in step 226, then it is determined via step 228 if the image has been modified by the user. If the image has been modified by the user, then it is determined if the user desires to save the modification in step 230. If the user desires to save the modification, then in step 232 the image is saved in a desired file format supported by one of the FEMs 168, 169, or 170. If appropriate, the image is saved in a different file format in step 232.

If it is determined in step 228 that the image has not been modified or it is determined in step 230 that the user does not wish to save the modifications, then step 234 is performed. In step 234, it is determined if the user has directed the printer 100 to save the image in a different file format. If so, then in step 236 the image is saved in a new file format supported by the printer 100. Consequently, the user is able to view, modify, print, and change the file format of an image using the printer 100. In addition, the printer 100 is capable of processing raw image data, such as CFA data, and displaying the image to the user.

A method and system has been disclosed for providing a printer having increased functionality. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A printer capable of generating a hard copy of at least one image stored in an image file, the printer comprising:
   a graphical user interface for allowing a user to view at least a portion of the image;
   a printing device coupled with the graphical user interface for printing the hard copy of the at least one image;
   means for loading the at least one image from a removable memory to the printer; and
   means for allowing a user to modify the at least one image;
   wherein the graphical user interface and the printing device are integrated together in the printer;
   a control application;
   a plurality of file extension modules ("FEMs") supporting a plurality of formats; and
   a FEM management layer coupled with the plurality of FEMs and the control application, the FEM management layer for communicating with the plurality of FEMs to write or read an image file having at least one of plurality of formats;
   wherein the at least one image in the image file is captured by an image capture device separate from the printer, the printer being incapable of capturing images.

2. The printer of claim 1 wherein the at least one image is stored on the removable memory in a first format and
   means coupled with the graphical user interface for storing the at least one image in a second format.

3. The printer of claim 2 wherein the first format includes raw image data.

4. A printer capable of generating a hard copy of at least one image stored in an image file on a removable memory, the image including raw image data, the printer comprising:
   a port configured to couple to the removable memory, allowing the printer to load the at least one image from the removable memory
   a control application for controlling the printer;
   at least one image processing module coupled with the control application, the at least one image processing module for processing the raw image data to provide a processed image and for storing the processed image in a first format;
   a printing device coupled with the control application for printing the hard copy of the at least one image;
   a first file extension module ("FEM") including the first format;
   at least a second file extension module ("FEM") including a second format; and
   a FEM management layer coupled with the first FEM, the at least the second FEM, and the control application, to FEM management layer for communicating with the first FEM and the at least the second FEM to write or read an image file having the first format or the second format;
   wherein the at least one image in the image file is captured by an image capture device separate from the printer, the print being incapable of capturing images.

5. The printer of claim 4 further comprising:
   a Joint Photographic Experts Group ("JPEG") engine coupled with the at least one management layer for processing image data in the first format.

6. The printer of claim 4 further comprising:
   a graphical user interface coupled with the control application for allowing a user to view at least a portion of the at least one image;

wherein a user is capable of modifying the at least one image.

7. A method for allowing a user to print at least one image stored in an image file using a printer, the method comprising the steps of:

displaying a list including the at least one image;

loading the at least one image file from a removable memory processing raw image data in the at least one image file using the printer if the at least one image file includes the raw image data, the printer including a control application, a plurality of file extension modules ("FEMs") supporting a plurality of formats, a FEM management layer, and at least one image processing module coupled with the control application;

allowing a user to print the least one image;

allowing a user to modify the at least one image using the printer; and saving the modified at least one image using the FEM management layer and at least one of the plurality of FEMs;

wherein the at least one image in the image file is captured by an image capture device separate from the printer, the printer being incapable of capturing images.

8. The method of claim 7 wherein the at least one image is saved in at least a first format, the method comprising the steps of:

allowing a user to save the at least one image in a second format.

9. A method for allowing a user to print at least one image stored in an image file using a printer having a display, the method comprising the steps of:

loading the at least one image from a removable memory directly to the printer, the printer including a control application, a plurality of file extension modules ("FEMs") supporting a plurality of formats, a FEM management layer, and at least one image processing module coupled with the control application;

displaying the at least one image on the display;

allowing a user to print the at least one image;

allowing a user to modify the at least one image using the printer; and saving the modified at least one image using the plurality of FEMs and the FEM management layer;

wherein the at least one image in the image file is captured by an image capture device separate from the printer, the printer being incapable of capturing images.

10. The method of claim 9 further comprising the steps of:

processing raw image data in the at least one image file using the printer if the at least one image file includes the raw image data;

allowing a user to print the at least one image.

11. The method of claim 9 wherein the at least one image is saved in at least a first format, the method comprising the steps of:

allowing a user to save the least one image in a second format.

\* \* \* \* \*